Nov. 5, 1957

M. E. NOE 2,812,455

LINEAR MOTION DEVICE

Filed Dec. 29, 1955

WITNESSES:
Leon M. Garman
J. E. Bieber

INVENTOR
Myron E. Nce
BY Cuthinn T. Stratton
ATTORNEY

Nov. 5, 1957  M. E. NOE  2,812,455
LINEAR MOTION DEVICE

Filed Dec. 29, 1955  4 Sheets-Sheet 2

Nov. 5, 1957  M. E. NOE  2,812,455

LINEAR MOTION DEVICE

Filed Dec. 29, 1955  4 Sheets-Sheet 3

United States Patent Office 2,812,455
Patented Nov. 5, 1957

2,812,455

LINEAR MOTION DEVICE

Myron E. Noe, Whitehall Boro, Pa., assignor to Westinghouse Electric Corporation, East Pittsburgh, Pa., a corporation of Pennsylvania Application December 29, 1955, Serial No. 556,184

14 Claims. (Cl. 310—83)

This invention pertains to linear motion devices and, more particularly, to a linear motion device of the type consisting of a lead screw driven by an expandable nut.

The linear motion device of this invention is an improvement over the linear motion device disclosed in the copending application of Roman and Robinson, Serial No. 496,688, filed March 25, 1955, now Patent No. 2,780,740 entitled Linear Motion Device, and assigned to the same assignee as this invention. The linear motion device disclosed in the Roman and Robinson application, while very successful as a linear motion device, has some disadvantages, such as the lack of a fixed pivot point for the movable rotor arms and the lack of any means for synchronizing the movement of the rotor arms to ensure the disengagement of all of the roller nuts from the lead screw simultaneously. Also, the spring forces available for disengaging the roller nuts from the lead screw were limited so that the disengagement of the roller nuts from the lead screw could not be precisely controlled.

This invention eliminates the above disadvantages by providing a rotor having only two pivoted rotor arms which are coaxially pivoted on a common axis, thus providing a more reliable mechanism than that disclosed in the application cited above. The use of only two rotor arms also allows better control of the air gap between the rotor and the stator of the driving motor, thus increasing the electrical efficiency of the drive motor. This invention also includes a synchronizing means to ensure that all of the roller nuts disengage from the lead screw simultaneously.

Accordingly, an object of this invention is to provide a linear motion device having two coaxially pivoted rotor arms and means for driving a lead screw mounted on one end of each of the rotor arms.

Another object of this invention is to provide a linear motion device having pivoted rotor arms with means for driving a lead screw mounted on one end of each of the rotor arms, and means for synchronizing the movement of the rotor arms to ensure that all of the drive means disengage from the lead screw simultaneously to allow the lead screw to be driven by other means.

These and other objects and advantages of this invention will be more easily understood from the following detailed description when taken in conjunction with the attached drawings, in which.

Figure 1:
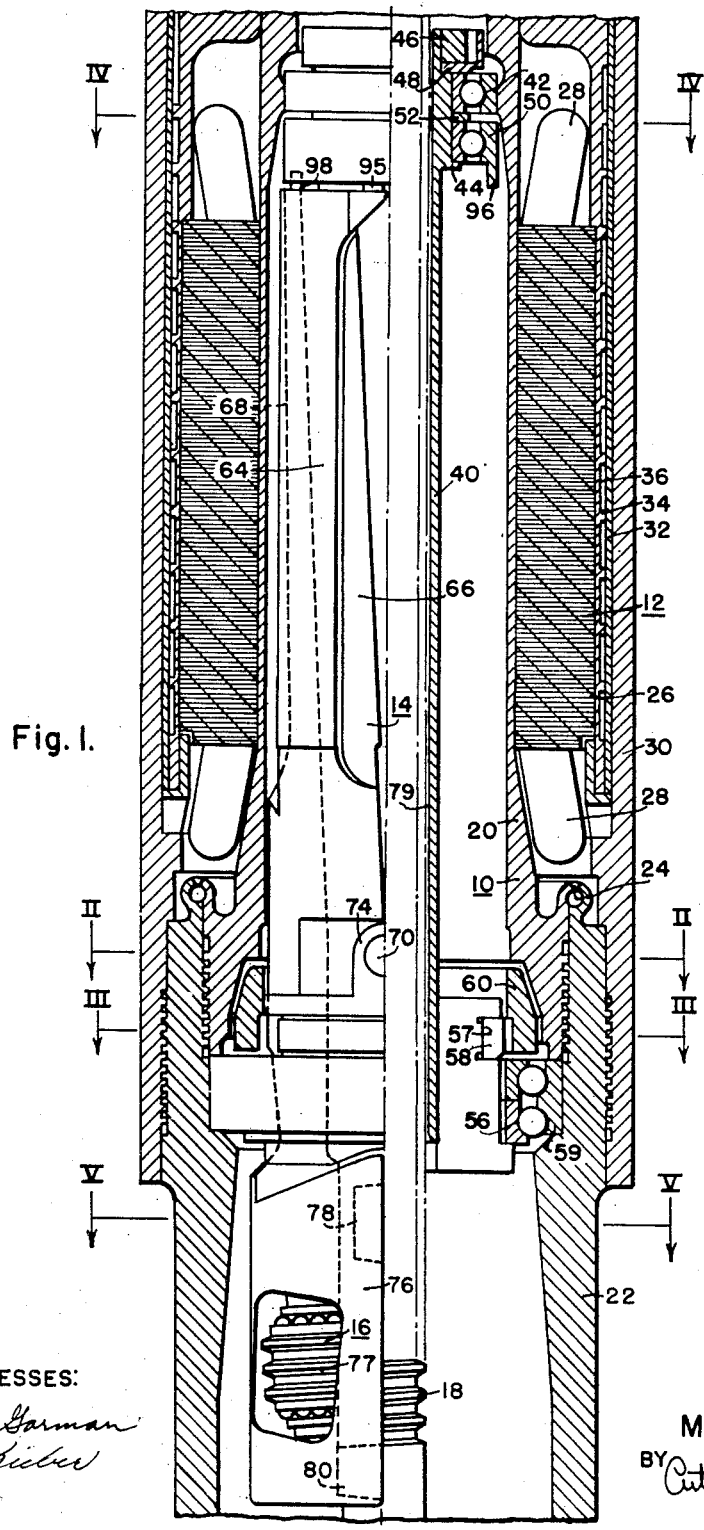
Figure 1 is a longitudinal sectional view of a linear motion device constructed in accordance with this invention with one-half of the rotor assembly shown in elevation.

The linear motion device of this invention consists of a composite tubular member 10 on the outer surface of which the stator assembly 12 is mounted. A rotor assembly 14 is mounted in the tubular member 10 and has suitable means 16 for driving the lead screw 18. The tubular frame 10 consists of an upper motor frame 20 which is attached to a lower member 22 by means of a threaded connection. The motor frame 20 is preferably of a corrosion-resistant, non-magnetic material, such as stainless steel, and the lower member 22 should be of a similar material. If it is desired to make the linear motion device completely leak proof, so that it may operate in systems containing dangerous fluids, a seal weld 24 may be used to seal the threaded connection between the motor frame 20 and the lower member 22. The stator assembly 12, which is positioned on the outer frame 20, consists of a stack of suitable stator laminations 26 which have suitable inwardly opening slots (not shown). A suitable stator winding, for example, a three-phase, four-pole winding, may be placed in these slots to terminate in end turns 28 at each end of the stack laminations. An outer tubular member 30, which encloses the stator assembly, is attached to the lower member 22 by means of a threaded connection. Positioned between the outer tubular member 30 and the outer surface of the stator assembly are two tubular members 32 and 34 which form a cooling jacket around the stator assembly. A spiral groove 36 is formed in the outer surface of the inner tubular member 34, and the outer tubular member 32 closes the open side of the spiral groove 36 to form a closed spiral path around the outer surface of the stator assembly through which a fluid may be circulated to cool the stator assembly. While a cooling means is shown and described, it, of course, may be omitted in those cases where the linear motion device is used in a system handling relatively cool fluids.

Figure 2:
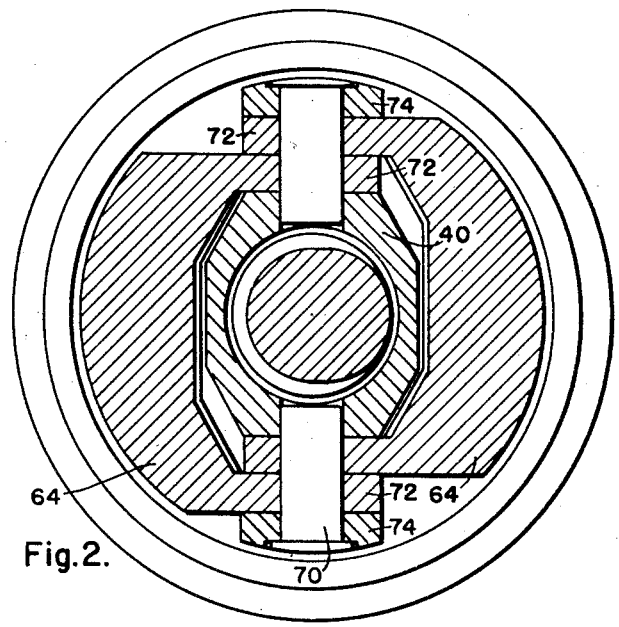
Fig. 2 is an enlarged transverse section taken along line II—II of Fig. 1 showing the coaxial pivot pins of the two rotor arms.
Figure 6:
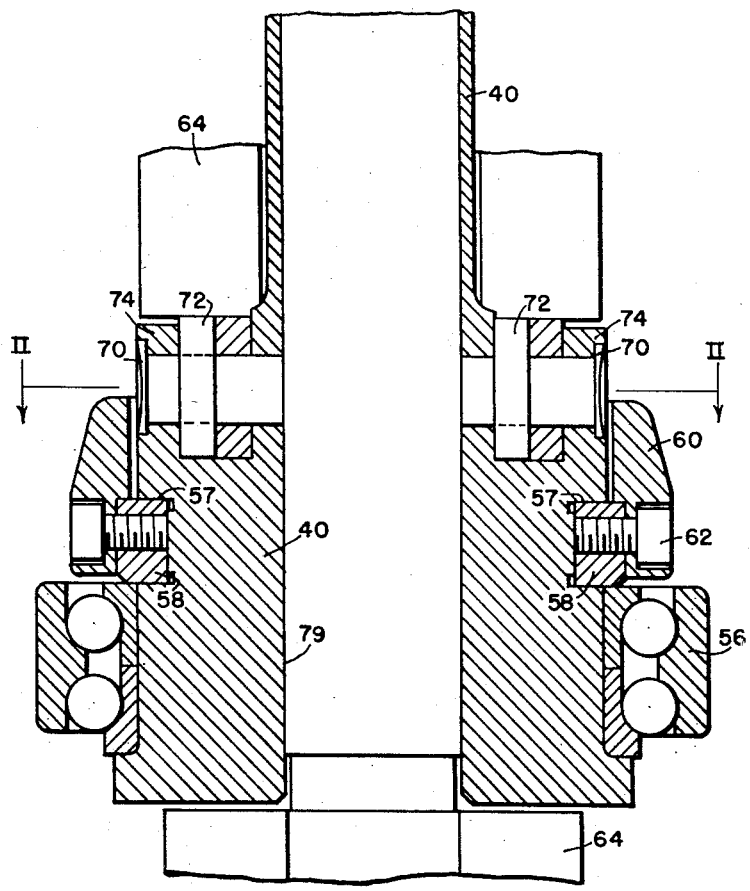
Fig. 6 is a partial elevational view of the rotor tube shown in Fig. 1 rotated 90 degrees and drawn to an enlarged scale.

The rotor assembly 14, of this invention, consists of a rotor tube 40 which is mounted in the motor frame 20 by means of a ball bearing 42 at its upper end and a second double-row ball bearing 56 at its lower end. The rotor tube 40 has a thin-walled tubular upper portion which increases in thickness at the lower end of the rotor tube, as shown in Fig. 6, in order to support the lower bearing 56 and provide a mounting for the rotor arms 64 to be described later. The lower end of the rotor tube 40 has two diametrically opposed axial slots 75 shown in Fig. 3 which allow the rotor arms 64 to extend therethrough. Above the lower bearing the rotor tube is reduced to a generally octagonal cross-section where the rotor arms 64 are mounted (Fig. 2). The rotor tube has a uniform inner diameter 79 slightly larger than the diameter of lead screw 18, to allow the lead screw 18 to pass freely through the rotor assembly. The rotor tube may be formed of any desired non-magnetic material but is preferably a non-magnetic, corrosion-resistant material, such as stainless steel. The upper ball bearing 42 is attached to the upper end of the rotor tube 40 by means of a nut 46 and a washer 48 which lock the inner races of the ball bearing 42 and bearing 50 described below securely against an outwardly projecting shoulder 44 formed on the rotor tube 40. The outer race of the ball bearing 42 is mounted in the motor frame 10 by means of a sliding fit. A second ball bearing 50 has its inner race mounted on the upper end of the rotor tube 40 by means of the nut 46 and washer 48, previously described, and it is spaced from the bearing 42 by a washer 52. The ball bearing 50 serves as a synchronizing means for the rotor arms and as a means for limiting the outward travel of the rotor arms, as will be described later, and does not support the upper end of the rotor tube. The inner race of the lower ball bearing 56 is mounted on the enlarged lower end of the rotor tube 40 by means of a two-piece ring-shaped key 58, shown in Figs. 3 and 6. The ring-shaped key 58 is a snug fit in a groove 57 which is formed in the enlarged lower end of the rotor tube and is retained in place by means of an outer retaining ring 60. Two diametrically opposed cap screws 62, each of which pass through both the retaining ring 60 and one section of the ring-shaped key 58, thread into the enlarged lower portion of the rotor tube 40, and are used for securing both the retaining ring 60 and the section of the ring-shaped key 58 in place. The outer race of the lower ball bearing 56 is locked between the lower end of the motor frame 20 and a shoulder 59 formed on the upper end of the lower member 22 when these two members are joined together.

Figure 3:
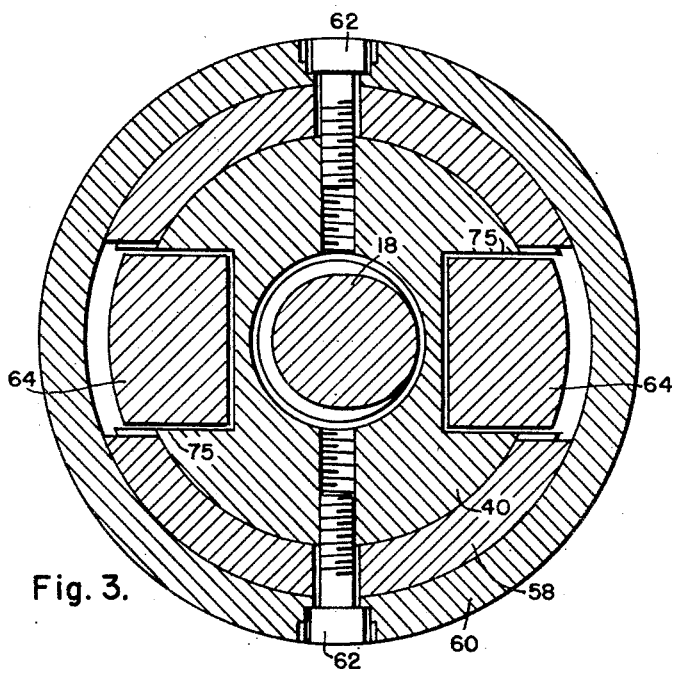
Fig. 3 is an enlarged transverse section taken along line III—III of Fig. 1 showing the two-piece key used for retaining the lower bearing of the rotor.
Figure 4:
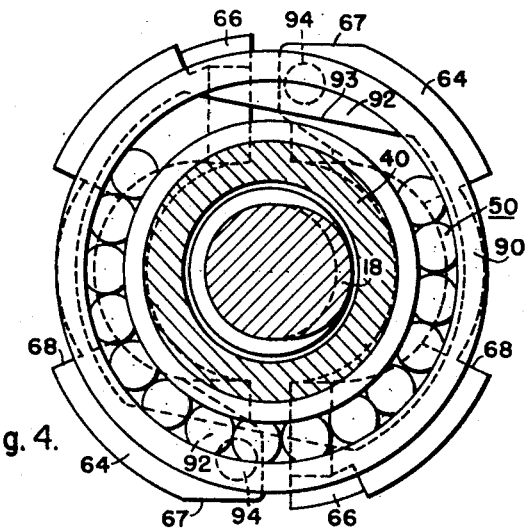
Fig. 4 is an enlarged transverse section taken along line IV—IV of Fig. 1 showing the means used for synchronizing the movement of the rotor arms with some of the anti-friction members of the bearing omitted for clarity.
Figure 5:
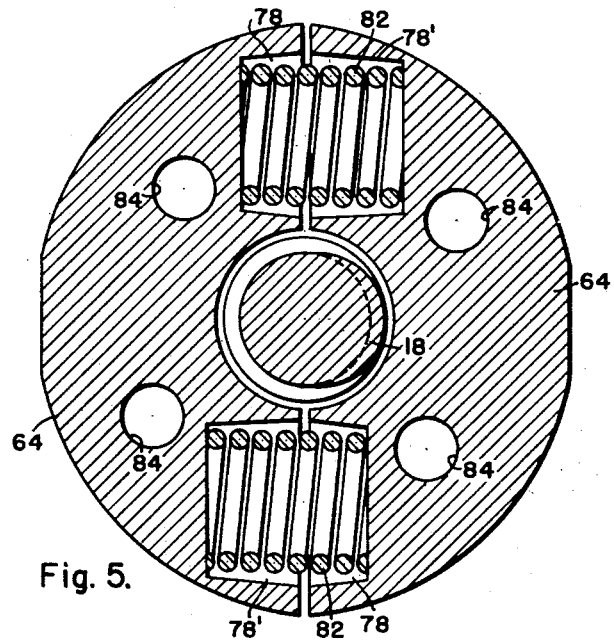
Fig. 5 is an enlarged transverse section taken along line V—V of Fig. 1 showing the mounting of the compression springs used for disengaging the roller nuts from the lead screw.

Two rotor arms 64 are coaxially pivoted adjacent the lower end of the rotor tube 40 by means of two diametrically opposed pivot pins 70, as better shown in Figs. 2 and 6. The upper portion of each of the rotor arms 64 is curved in cross-section and is provided with a suitable slot 68 on the outer side thereof extending axially for substantially the length of the stator 12, as shown in Figs. 1 and 4. One side edge of each rotor arm 64 is provided with a notch 66, and the other side edge of each rotor arm is provided with a flat surface 67 so that the two rotor arms 64 with slots 68, notches 66 and flat surfaces 67, when assembled, will form essentially a reluctance type of rotor having four poles. The rotor arms should be formed of a magnetic, corrosion-resistant material, such as magnetic stainless steel. Each of the rotor arms is provided with two extending ears 72 on opposite sides below the slots 68, with the ears of each of the rotor arms overlapping, as shown in Fig. 2. Another ear 74 extends axially upward from the enlarged lower portion of the rotor tube 40, as shown in Fig. 6, so as to overlap the ears 72 extending from the rotor arms 64. The pins 70 pass through the aligned holes of the ears 72 and 74 on each side, so as to form a coaxial pivot for the two rotor arms 64 and are retained in the rotor tube by the retaining ring 60. Each of the rotor arms 64 is reduced in cross-section to approximately a rectangular shape, as shown in Fig. 3, where it passes through the inner race of the ball bearing 56. After passing through the inner race of the ball bearing 56, the rotor arms are increased in cross-section to a generally semicircular shape, as shown in Fig. 5. The drive means 16 consists of four roller nuts 77, similar in construction to those shown in the Roman and Robinson application, two of which are mounted on the lower end of each rotor arm. Each of the roller nuts 77 are rotatably mounted in pockets formed in the rotor arms by means of pins which project upwardly into recessed holes 84 formed in each of the rotor arms 64. Spring pockets 78, 78', and 80 are formed in the flat inner surface on each side of the semicircular portion of the rotor arms 64, with pockets 78 and 78' above the roller nuts 77 and pockets 80 below. Compression springs 82 are placed in the upper pockets 78, and similar springs (not shown) are placed in the lower pockets 80.

This invention thus provides a means whereby two rotor arms 64 may be coaxially pivoted about a common axis. This common axis is fixed on the rotor tube 40 and is located at an angle of approximately 90° to the axis of the rotor. By providing fixed coaxial pivot axes for the two rotor arms 64, it is possible to accurately control the air gap between the outer surface of the upper portions of the rotor arms 64 and the inner surface of the motor frame 20, so that the motor efficiency can be increased over that possible with the previous design. The control of the motor air gap is possible when the drive means 16 engages the lead screw since this gives one fixed point which, in combination with the fixed pivot axis, allows accurate control of the motor air gap at the upper portion of the rotor arms. Also, by using only two rotor arms, the magnetic attraction on each of the rotor arms when the stator is energized is greatly increased over that possible in the previous design, thus ensuring more reliable relatching of the roller nuts 77 with the lead screw 18. By using only two rotor arms instead of four, as in the previous designs, the amount of material in each of the rotor arms can be increased, thus increasing the magnetic attraction on each of the rotor arms. While four roller nuts 77 are shown, any number may be used, and the benefits of the two rotor arm design will still be desirable. Likewise, conical pins mounted on bearings may be used in place of the roller nuts to drive the lead screw, as shown in the Roman and Robinson application.

The synchronizing means for the two rotor arms is formed in the outer race of the upper bearing 50 by means of two diametrically opposed thickened portions 92 formed on the outer race, each of which has a circular hole 94 formed therein. The thickened portions 92 are formed only on the lower flange 96 of the outer race by opposed portions 93, as shown in Fig. 4. A pin 95, which projects from the upper end of each of the rotor arms 64 projects into the holes 94, respectively, and is a loose fit therein. Thus when the upper end of one of the rotor arms 64 tends to collapse or move inwardly, due to the outward force of the springs at the lower end of the rotor arms when the stator is deenergized, the other rotor arm 64 will move inwardly the same amount, since it is pivotally connected to the first arm. The outer race of the ball bearing 50 forms essentially a linking arrangement which is rotatable about its center and is pivotally attached to the end of each of the rotor arms 64 by means of the aforesaid pin 95, and thus the linking arrangement may be any desired form of solid member mounted for rotation about the axis of the rotor or a part of any other form of anti-friction bearing. By this means, should conditions be such that instantaneously the screw load is relieved from one arm, the spring reaction on that unloaded arm will not be lost but will be transmitted through the synchronizer to the loaded arm to better overcome load friction. The pivot center of the pin 95 of each rotor arm should be approximately 90° from the plane of rotation of the rotor arms about the pivot pins 70, as shown in Fig. 4, so that maximum efficiency can be achieved in synchronizing the two rotor arms 64. This will either reduce the spring force necessary to move the rotor arms inwardly when the stator is deenergized or will allow reliable collapsing with heavier screw loads.

A small downwardly extending flange 96 is also formed on lower end of the outer race of ball bearing 50 and serves to limit the outward movement of the rotor arm 64 by means of a small tab 98 projecting upward from the upper end of each of rotor arms 64 which engages the inner surface of the flange 96 to limit the outward movement of the rotor arms.

The operation of the linear motion device of this invention is identical with the linear motion device disclosed in the Roman and Robinson application. When the stator is energized with a low frequency alternating current, the upper portions of the rotor arms will move outward due to the magnetic attraction of the stator. The outward movement of the upper portion of the rotor arms will cause the lower portions of the rotor arms to move inwardly, thus latching or engaging the drive means 16 with lead screw 18. As the rotor assembly 14 rotates, it will impart a linear motion to the lead screw, the direction of which will depend upon the direction of rotation of the rotor assembly 14. Both the speed of travel of the lead screw 18 and its direction of travel can be accurately controlled by supplying the stator assembly 12 with an alternating current, the frequency of which can be varied, from any well-known source. Thus, when the frequency of the current is reduced, the speed of travel of the lead screw will be reduced, and if the phase of the current is reversed, the direction of travel of the lead screw 18 will also be reversed. If it is desired to hold the lead screw in one position, all that is necessary is to reduce the frequency of the current to zero and maintain the stator assembly 12 energized. If it is desired to release the drive means from the lead screw and drive the lead screw in one direction by other means, such as a compressed spring positioned on top of the lead screw, but not shown in this application, all that is necessary is to deenergize the stator assembly 12, and the springs at the lower end of the rotor arms will disengage the drive means 16 from the lead screw, and the lead screw can then be driven longitudinally by the other means. This arrangement for driving the lead screw by a compressed spring when the roller nuts are disengaged is more fully described in the copending application of Roman and Robinson and forms no part of this invention.

Accordingly, while a preferred embodiment of this invention has been described in detail, as required by the Patent Statutes, the invention should not be limited to this particular construction, inasmuch as it will be apparent to persons skilled in the art that various modifications and changes in this particular structure may be made without departing from the broad spirit and scope of this invention. Accordingly, the invention should not be limited except as may be required by the prior art.

I claim as my invention:

1. A linear motion device comprising, an electric motor having a stator and a rotor, said rotor comprising two members coaxially pivoted about an axis substantially transverse to the axis of said rotor at a point between the ends of said members, one end of each of said members extending under the stator and forming the rotor of said motor, and means for driving a lead screw mounted on the opposite end of each of said members.

2. A linear motion device comprising, an electric motor having a stator and a rotor, said stator being mounted on the outer surface of a tubular motor frame, said rotor comprising a cylindrical member rotatably mounted in said motor frame, two rotor arms coaxially pivoted on said cylindrical member for limited movement about an axis substantially transverse to the axis of said cylindrical member at a point between their ends, and means for driving a lead screw mounted on one end of each of said rotor arms.

3. A linear motion device comprising, an electric motor having a stator and a rotor, said stator mounted on the outer surface of a tubular motor frame, said rotor comprising a tubular member rotatably mounted in said motor frame, two rotor arms pivotally mounted coaxially on said tubular member on an axis substantially transverse to the axis of said tubular member at a point between their ends, one end of each of said rotor arms extending under said stator and forming the rotor of said motor, means for driving a lead screw mounted on the other end of each of said rotor arms, said lead screw being adapted to pass through said tubular member, and additional means for moving said other ends of said rotor arms outward to disengage said drive means.

4. A linear motion device comprising, an electric motor having a stator and a rotor, said stator being mounted on the outer surface of a tubular motor frame, said rotor comprising a tubular member rotatably mounted in said motor frame, two rotor arms mounted coaxially on said tubular member on an axis substantially transverse to the axis of said tubular member at a point between their ends, one end of each of said rotor arms extending under said stator and forming the rotor of said motor, means for driving a lead screw mounted on the other end of each of said rotor arms, said lead screw being adapted to pass through said tubular member, additional means for biasing said other end of each of said rotor arms to move said other end outward and disengage said drive means, and synchronizing means to equalize the outward movement of said other end of said rotor arms when said drive means is disengaged.

5. A linear motion device comprising, an electric motor having a stator and a rotor, a lead screw driven by said motor, two members coaxially pivoted on said rotor at a point between the ends of said members, means for driving said lead screw mounted on the one end of each of said rotor arms, biasing means for moving said one end outward to disengage said drive means, the other end of each of said rotor arms being pivotally connected to a link, and said link being pivoted on the axis of said rotor.

6. A linear motion device comprising, an electric motor having a rotor and a stator, said stator being mounted on the outer surface of a tubular motor frame, said rotor comprising a tubular support rotatably mounted in said motor frame by means of anti-friction bearings at each end, a pair of rotor arms coaxially pivoted on said tubular support at a point between their ends, one end of each of said rotor arms forming the rotor for said motor, a pair of rollers rotatably mounted on the other end of each of said rotor arms and adapted to effect a driving engagement with a lead screw, said lead screw being adapted to pass through said tubular support, biasing means for moving said other end of each of said rotor arms outward to disengage said rollers from said lead screw, a pin projecting from the said one end of each of said arms, each of said pins fitting in a recess formed in the outer race of another anti-friction bearing, the inner race of said bearing being mounted on said tubular support adjacent said one end of each of said rotor arms.

7. A linear motion device comprising, an electric motor having a rotor and a stator, a lead screw, a plurality of members pivotally mounted on said rotor at a point between their ends, means for driving said lead screw mounted on one end of each of said pivoted members, said one end of each of said pivoted members being movable towards and away from said lead screw to engage and disengage said drive means with said lead screw, and additional means engaging said members to synchronize the movement of said pivoted members to control the engagement and disengagement of said drive means with said lead screw.

8. A linear motion device comprising, an electric motor having a rotor and a stator, a lead screw mounted for linear movement substantially along the axis of rotation of said motor, the rotor of said motor having a pair of elongated arms at opposite sides thereof pivotally mounted intermediate their ends on a common axis substantially transverse to the axis of rotation of the motor at a point adjacent one end of the motor with said arms extending longitudinally of the rotor so that one end of each arm is opposite the stator and the other end of each arm extends along one side of the lead screw, and at least said one end of each arm being of magnetic material to be pivotally moved upon energization of said stator in a direction to cause engagement of the other end of each arm with said lead screw.

9. A linear motion device comprising, an electric motor having a rotor and a stator, a lead screw, a plurality of pivoted members mounted on said rotor, means for driving said lead screw mounted on one end of each of said pivoted members, said one end of each of said pivoted members being movable towards and away from said lead screw to engage and disengage said drive means with said lead screw, and additional means engaging said members to synchronize the movement of said pivoted members comprising, a solid member mounted for rotation about the axis of rotation of said rotor, and each of said pivoted members being pivotally connected to said solid member.

10. A linear motion device comprising, an electric motor having a rotor and a stator, a lead screw, a plurality of pivoted members mounted on said rotor, means for driving said lead screw mounted on one end of each of said pivoted members, said one end of each of said pivoted members being movable towards and away from said lead screw to engage and disengage said drive means with said lead screw, and additional means engaging said members to synchronize the movement of said pivoted members comprising an anti-friction bearing mounted on the axis of rotation of said rotor, the outer race of said bearing being free to rotate, and each of said pivoted members being pivotally connected to said outer race.

11. A linear motion device comprising an electric motor having a stator and a rotor, said rotor comprising two members pivoted about an axis substantially transverse to the axis of said rotor at a point between the ends of said members, means for driving a linear element mounted on an end of each of said members, additional means for moving said ends of said rotor arms to disengage said driving means, and synchronizing means engaging said members for equalizing the movement of said members to control the engagement and disengagement of said driving means with said linear element.

12. A linear motion device comprising an electric motor having a stator and a rotor, said rotor comprising two members coaxially pivoted about an axis substantially transverse to the axis of said rotor at a point between the ends of said members, one end of each of said members extending under said stator, said ends each being of arcuate configuration and partially surrounding said rotor to form at least one salient pole for said rotor, and means for driving a lead screw mounted on the opposite end of each of said members.

13. A linear motion device comprising an electric motor having a stator and a rotor, said rotor comprising two members coaxially pivoted about an axis substantially transverse to the axis of said rotor at a point between the ends of said members, one end of each of said members extending under said stator, said ends each being provided with an arcuate configuration partially surrounding said rotor and having a longitudinally extending slot disposed therein and dividing each of said ends into at least two salient poles of said rotor, and means for driving a lead screw mounted on the opposite end of each of said members.

14. Linear electromotive means having a stator and a rotor and adapted for moving an element in a substantially linear path, said electromotive means including a plurality of members pivotally mounted on said rotor at points between their ends, driving means mounted adjacent an end of each of said members for driving said element, means for moving said members to engage and to disengage said driving means relative to said element, and synchronizing means engaging said members to equalize the movement thereof to control the engagement and disengagement of said driving means with said element.

No references cited.